No. 633,753. Patented Sept. 26, 1899.
W. K. COWAN.
BICYCLE GEAR.
(Application filed Aug. 14, 1897.)
(No Model.)
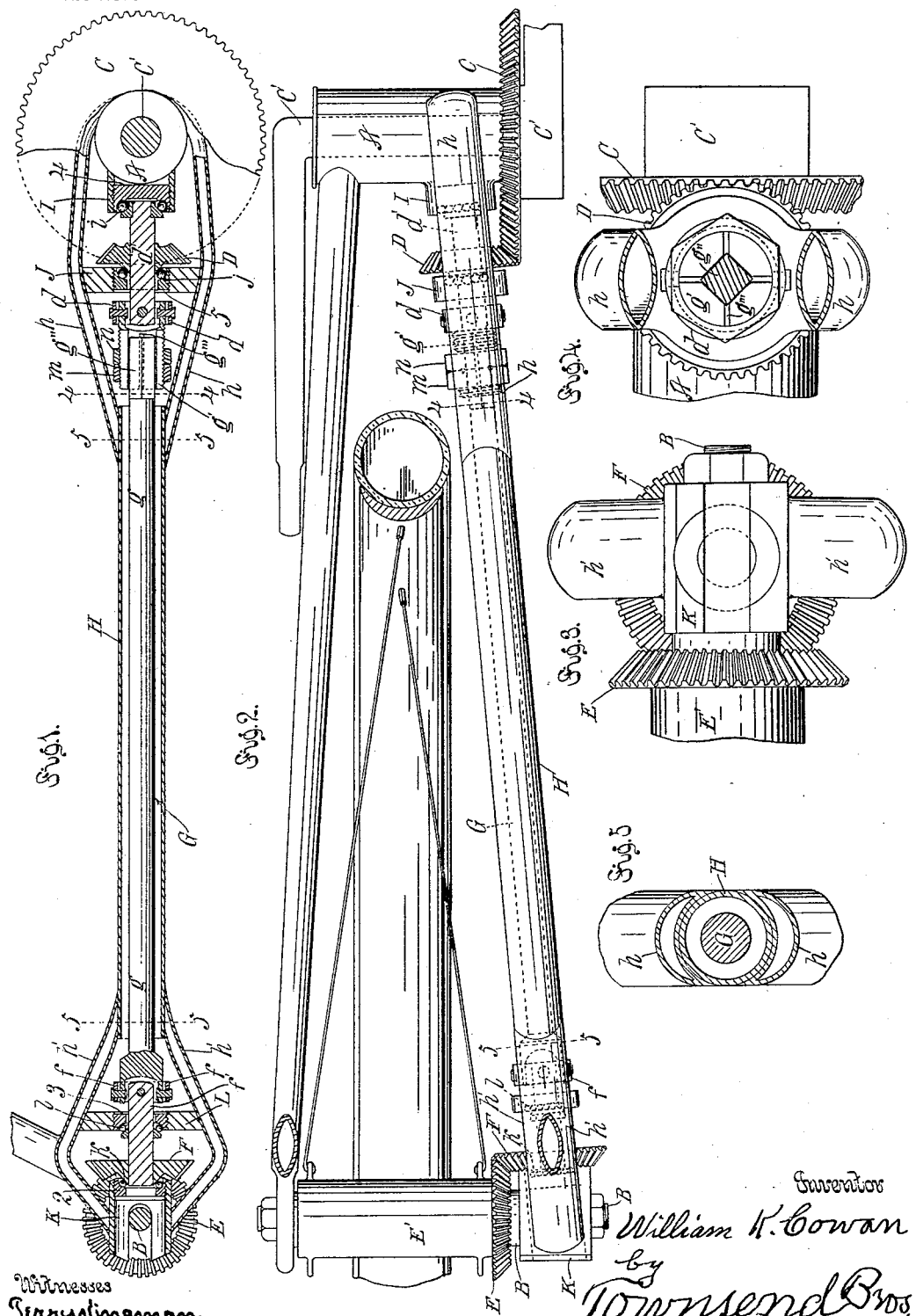
Witnesses
Perry Klingman.
E. A. Waterman.
Inventor
William K. Cowan
by
Townsend Bros.
his Attys.
THE NORRIS PETERS CO., PHOTO-LITHO., WASHINGTON, D. C.

UNITED STATES PATENT OFFICE.

WILLIAM K. COWAN, OF LOS ANGELES, CALIFORNIA.

BICYCLE-GEAR.

SPECIFICATION forming part of Letters Patent No. 633,753, dated September 26, 1899.

Application filed August 14, 1897. Serial No. 648,205. (No model.)

*To all whom it may concern:*

Be it known that I, WILLIAM K. COWAN, a citizen of the United States, residing at Los Angeles, in the county of Los Angeles and State of California, have invented a new and useful Chainless Bicycle-Gear, of which the following is a specification.

The object of my invention is to provide a practical substitute for the sprocket and chain for transmitting power from the crank to the rear wheel of a bicycle. I use beveled gearing.

The fault with beveled gearing as heretofore used in bicycles is the binding of the teeth between the gear-wheels. The binding is caused by the spring of the frame or rear forks. This makes the meshing of the teeth erratic and causes the bicycle to run hard. The angles of contact between the beveled gear-wheels must be fixed in their relation to each other or the wheels will run hard and wear rapidly. If the angles of contact are not fixed in their relation to each other, the wheels will sometimes absolutely lock when the bicycle is traveling over rough places or when the rider is propelling the wheel up a steep hill.

An object of my invention is to admit of the use of lighter and less absolutely rigid frames than heretofore and to do this by providing absolute security against any binding of the gears from lateral action and yet to absolutely avoid any looseness which will allow backlash.

By my invention I provide superior means for rigidly holding the bevel-gears in unvarying mesh and for coupling the counter-shaft gears together, so as to allow for any deflection of the frame, which is liable to occur with frames of desirable light weight.

It is a further object of my invention to attain this result by means which will be extremely light and strong, and which can be applied to any modern bicycle-frame of light or heavy weight, and which will be easily applied and readily adjusted. I avoid the necessity of any irregular or heavy drop-forgings.

My invention includes the combination of the bicycle crank-gear, the transmitting-gear meshing therewith, means for holding the gears in mesh, the rear-wheel gear, the rear transmitting-gear meshing therewith, means for holding the rear gears in mesh, and the telescopic rotary transmitting-rod connected with the transmitting-gears by universal joints. My invention also includes the parts and combinations hereinafter described and claimed.

The accompanying drawings illustrate my invention.

Figure 1 is a fragmental side elevation, partly in section, showing my invention as applied for use. Fig. 2 is a fragmental plan of the crank, rear fork, and axle of a bicycle provided with my invention. A fragment of the wheel is also shown. Fig. 3 is a rear elevation of the connection with the rear axle. Fig. 4 is a cross-section on line 4 4, Figs. 1 and 2, to show the connection with the crank-shaft and crank-gearing. Fig. 5 is a section on line 5 5, Figs. 1 and 2.

In the accompanying drawings, A indicates the crank-barrel.

B indicates the rear-axle bearing.

C indicates the crank-gear fastened to the crank $C'$. D indicates transmitting-gear meshing with the crank-gear. Suitable means are provided for holding these two gears in mesh.

E indicates the rear-wheel gear fixed on the rear axle $E'$, and F the rear transmitting-gear meshing therewith, and suitable means are provided for holding the rear gears E F in mesh.

G indicates a telescopic rotary transmitting-rod connected with the transmitting-gears D F by universal joints, so that the connection between the transmitting-gears is flexible and extensible. The transmitting-rod is formed of two members $g$ and $g'$. The member $g$ is a rod which passes through a tubular connection H, (being one of the rear forks,) which connects the crank-barrel with the rear-axle bearing. One end of the rod member $g$ is connected with the gear F by a universal joint $f$, which is attached to the end of the axle $f'$ of the gear F. The other end of the rod member $g$ is angular, preferably square, as at $g''$, and fits into the socket $g'$, which is connected with the beveled transmitting-gear D by a universal joint $d$, which is connected with the axle $d'$ of the gear D. The means for holding the beveled gears stationary with relation to the gears with which they mesh respectively are rigidly connected with the crank-barrel in the one instance and with the rear axle in the other instance.

I indicates a bearing-block rigidly fixed to the crank-barrel, and $i$ indicates a ball-bearing connection between the block I and the axle $d'$ of the beveled wheel D.

J indicates a bearing-block rigidly fastened to the crank-barrel by means of the strap connection $h$ of the rear fork H and provided with a ball-bearing $j$.

K indicates a bearing-block fastened to the rear-axle bearing and provided with a ball-bearing $k$ for one side of the rear beveled transmitting-gear F. L indicates another block or support fastened to the rear-axle bearing and provided with ball-bearings $l$ for the other side of the rear transmitting beveled gear. For convenience of assembling the cups 2, 3, 4, and 5 of the several ball-bearings are screwed into the blocks in which they are respectively held. These ball-bearings hold their respective transmitting-gears against end thrust and allow the gears to rotate, and the respective transmitting-gears are held in exact position with relation to the driving-gear C and the driven gear E, with which they mesh respectively. Any change of position between the crank-gear C and the rear-wheel gear E by the straining of the bicycle-frame does not displace the gears D C with relation to each other nor displace the gears E F with relation to each other. The telescopic rod and universal joints which connect the transmitting-gears together allow these gears to rotate freely and to change their relative positions to each other either toward or from each other under severe strain or to be wrenched in a lateral or vertical direction. It is to be understood that the deflection or endwise movement will be but slight. I preferably make the socket $g'$ adjustable by splitting the end, as at $g'''$, and binding the same with binding-nuts $m\,n$ to draw the socket to fit the end of the rod member $g$ to prevent undue looseness.

The tubular connection H has Y connections $h\,h'$ at its ends, respectively fixed to the crank-barrel and to the rear-axle bearing, and the transmitting-gears are mounted within the Y's, respectively, and the connecting-rod which connects the two transmitting-gears extends lengthwise through the tubular connection. The branches $h\,h'$ of the Y's are formed of flattened tubing and are brazed or lap-welded on the crank-barrel and rear-axle bearing-block K, respectively. By making the Y's vertical—that is, with the branches one above the other—the greatest strength is secured with the least weight of material, and by arranging the bearing-blocks J and K intermediate the ends of the branches each one acts as a strut or brace to increase the strength of the Y, as well as furnishing a support for the stub-axle. The location of the bearing-block at a distance from the bearing for each of the stub-axles $f'$ and $d'$, respectively, gives a support for each axle on each side of its bevel-gearing, thereby holding each of said axles in rigid relative position with the adjacent parts of the machine and always keeping its bevel-gear in proper mesh with its companion. If it were not for this extended bearing, or if the bearing were only on one side of the bevel-wheel, the strain upon the bevel-gear would cause it to cant or get out of proper relation to its companion, and thereby cause it to increase the friction and wear upon the parts. Between these rigid bearings at the ends are placed the universal and telescopic connections, which permit the flexing or springing motion of the light frame without affecting the relation of the bevel-gears to each other.

It is to be understood that suitable dust-caps will be placed around the gearing; but these are omitted from the views for clearness of illustration.

Now, having described my invention, what I claim as new, and desire to secure by Letters Patent, is—

1. In a bicycle, the combination with the crank-barrel and the rear-axle bearing, each of which is provided with a stub-axle bearing; of a tubular connection therebetween, each end of which is provided with a vertical Y; a brace across each Y intermediate its ends, and provided with a bearing; a stub-axle in each brace and in its respective stub-axle bearing one end of which projects beyond the brace-bearing; a bevel-gearing on each stub-axle, between its bearings; bevel-gearing engaging therewith; and a flexible and telescopic connection connecting the projecting ends of said stub-axles.

2. In a bicycle, the combination with the crank-barrel and the rear-axle bearing, each of which is provided with a stub-axle bearing; of a tubular connection therebetween, each end of which is provided with a vertical Y; a stub-axle journaled in each Y and in its respective stub-axle bearing; bevel-gearing on each axle; bevel-gearing engaging therewith; a universal joint on the projecting end of each axle, one of which is provided with a telescopic member; a rod, one end of which engages with the telescopic member and the other end engages with the other universal joint; and means for adjusting the telescopic members to each other.

WM. K. COWAN.

Witnesses:
JAMES R. TOWNSEND,
ALFRED I. TOWNSEND